United States Patent [19]

Wells

[11] 3,849,665
[45] Nov. 19, 1974

[54] SHORT CIRCUIT PROTECTED MASTER-SLAVE POWER SUPPLY

[75] Inventor: John C. Wells, Tolland, Conn.

[73] Assignee: United Aircraft Corporation, East Hartford, Conn.

[22] Filed: Oct. 1, 1973

[21] Appl. No.: 402,423

[52] U.S. Cl............. 307/24, 307/86, 317/31, 317/33 VR, 323/22 T, 323/23
[51] Int. Cl............................... G05f 1/56
[58] Field of Search............ 323/9, 23, 25, 227, 66; 307/43, 52, 85–87, 24; 317/33 VR, 31

[56] References Cited
UNITED STATES PATENTS

| | | | |
|---|---|---|---|
| 3,571,604 | 3/1971 | La Porta | 323/23 |
| 3,573,553 | 4/1971 | Mietz | 317/33 VR |
| 3,694,662 | 9/1972 | Grygera et al. | 323/25 |

Primary Examiner—J. D. Miller
Assistant Examiner—Harry E. Moose, Jr.
Attorney, Agent, or Firm—M. P. Williams

[57] ABSTRACT

A master-slave power supply has a threshold detector on the slave supply to detect loading of the slave supply sufficient to lower its voltage below a threshold level, following which the master supply is variably clamped in response to a linear function of the slave supply output voltage as well as some function of the master supply voltage, thereby to provide slaving of the master supply to the slave supply in response to overload conditions. The variable clamping is effected in one disclosed embodiment by providing a control voltage to a clamp input of a standard operational amplifier, and in another embodiment by providing the control voltage to a separate clamping circuit.

3 Claims, 3 Drawing Figures

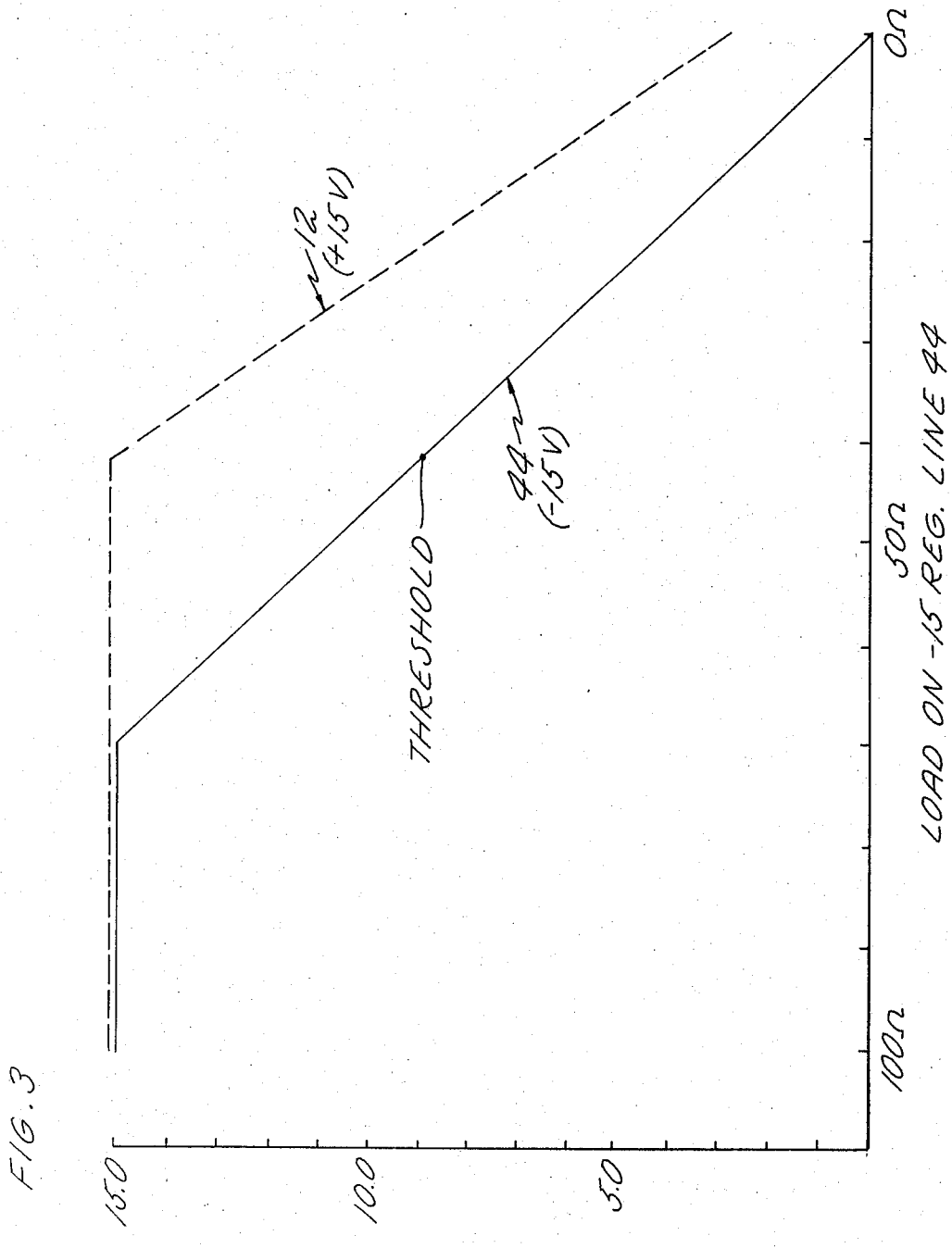

SHORT CIRCUIT PROTECTED MASTER-SLAVE POWER SUPPLY

BACKGROUND OF THE INVENTION

1. Field of Invention

This invention relates to masterslave power supplies, and more particularly to voltage reduction of a master supply in response to overloading of a slave supply.

2. Description of the Prior Art

Related, regulated power supplies are well known in the art. In many instances, each power supply may operate independently of the other so as to supply suitable voltages to various circuits. In such cases, each power supply may or may not have independent overload protection of some sort. It is also known to relate two power supplies in such a fashion that one is slaved to the other so that any changes in one supply will cause a complementary change in the other supply, thereby permitting common load rejection of power supply variations, and the like. In related power supplies, particularly in a master-slave configuration causing one supply to follow the other, reduction of the master supply voltage automatically causes the slave supply to reduce output voltage concomitantly. However, the converse is not true: it is inherently difficult to provide tracking of a master power supply to the reduced output voltage of a slave power supply as a result of overload conditions.

SUMMARY OF INVENTION

The principal object of the present invention is to provide a master-slave power supply in which the master power supply is caused to be slaved to the slave power supply whenever the slave power supply is overloaded.

According to the present invention, a master-slave power supply includes means for sensing the overloading of the slave power supply to an extent at which its voltage is reduced by a given threshold amount, after which the master power supply is slaved to the slave power supply so that its output voltage is similarly reduced. In further accord with the present invention, whenever overloading of the slave power supply causes a reduction in its output voltage below a threshold, a control voltage linearly related to the voltage of the slave power supply and the master power supply is utilized to control the output of the master power supply. In further accord with the present invention, a control voltage relating to the output of a master-slave power supply is utilized, when the slave power supply output voltage is reduced below a threshold amount, to variably clamp the output of the master power supply.

The present invention provides for tracking of master-slave power supplies even in the event of overloading of the slave power supply. The invention is easily implemented using known technology and readily available hardware. It may be implemented by simply applying a control voltage to the compensation input of a well known operational amplifier chip which is widely marketed, or it may be implemented with separate variable clamping means, in either discrete or integrated form.

Other objects, features and advantages of the present invention will become more apparent in the light of the following detailed description of preferred embodiments thereof, as illustrated in the accompanying drawing.

BRIEF DESCRIPTION OF THE DRAWING

FIG. 3 is a diagram illustrating voltage/load relationships of the embodiment of FIG. 1.

DESCRIPTION OF THE PREFERRED EMBODIMENT

Figure 1:
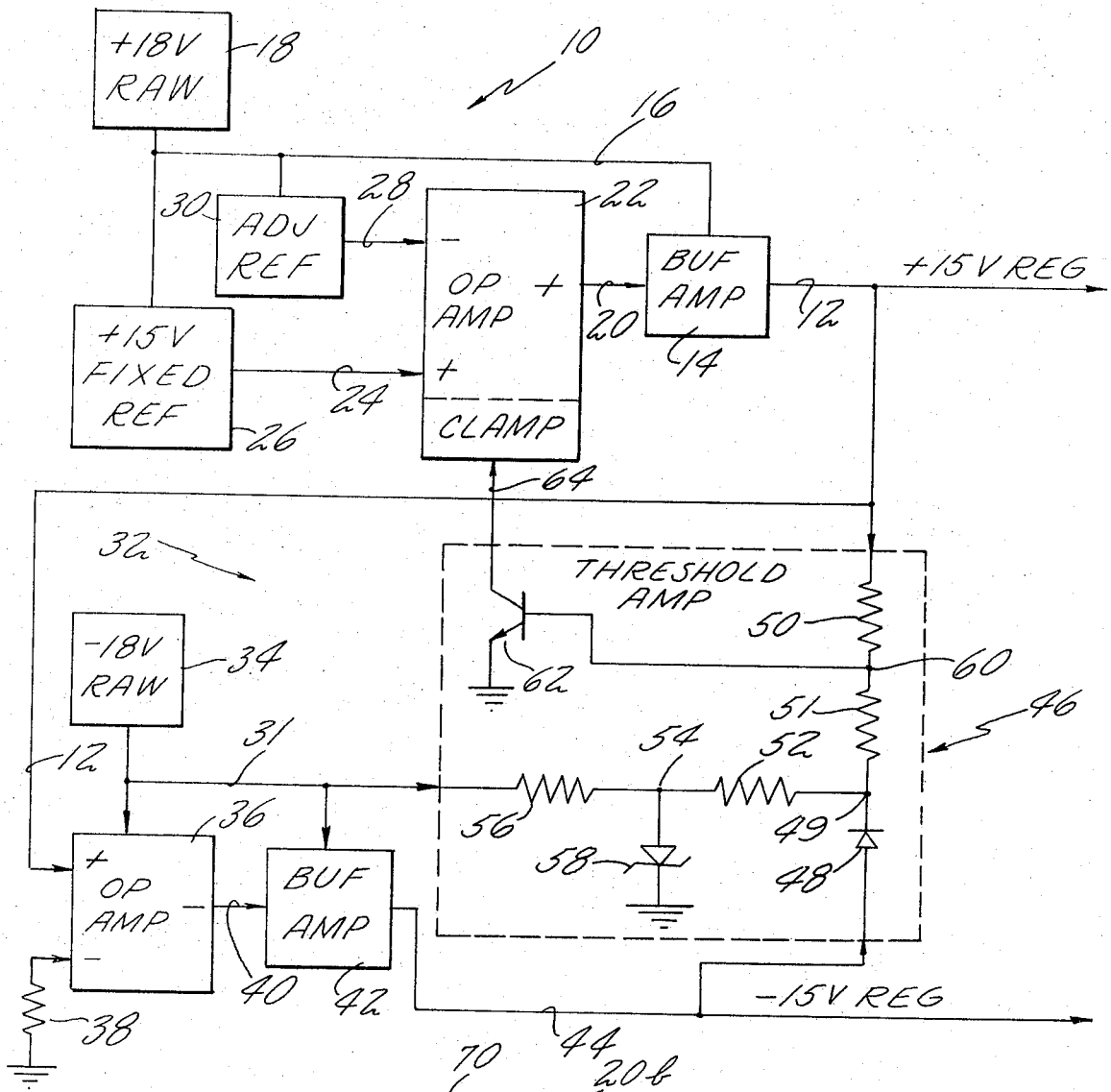
FIG. 1 is a schematic block diagram of a preferred embodiment of the present invention.

Referring now to FIG. 1, a +15 volt regulated power supply 10 provides regulated +15 volts on a line 12 at the output of a buffer amplifier 14, which may comprise a pair of power NPN transistors (such as 2N3766 transistors) arranged in a Darlington configuration. The buffer amplifier 14, as well as other circuitry in the +15 volt regulated supply 10 is operated in response to unregulated or raw voltage provided on a line 16 by a +18 volt raw power source 18. The input to the buffer amplifier 14 comprises regulated voltage on a line 20 which, however, is not capable of driving a suitably heavy load without the additional power amplification of the buffer amplifier 14. The regulated voltage on the line 20 is supplied by an operational amplifier 22 which in turn is provided a +15 volt fixed reference input to its noninverting input on a line 24 from a +15 volt fixed reference source 26, which may typically comprise a suitable Zener diode and resistors connected to the raw +18 volt source 18, as is well known in the art. The inverting input of the operational amplifier 22 may be connected by a line 28 to an adjustable reference 30 which allows adjusting the precise voltage of the supply 10 to whatever voltage is desired in the range of the supply 10, such as +15 volts in the example herein.

A −15 volt regulated supply 32 is operated in response to unregulated negative voltage on a line 31 from a −18 volt and includes an operational amplifier 36 in which the inverting input is connected to the +15 volt regulated output on the line 12 and the noninverting input is suitably connected through a resistor 38 to ground. The output of the operational amplifier 36 on a line 40 is passed through a buffer amplifier 42 which may typically comprise a PNP power transistor (such as a 2N2907a) driving an NPN power transistor (such as a 2N3766) in a Darlington configuration so as to provide regulated −15 volts on an output line 44 capable of driving a suitable load. Thus the −15 volt regulated supply in the embodiment of FIG. 1 simply comprises the inverted and buffered output of the +15 volt regulated supply 10.

It is apparent that if the +15 volt regulated supply suffers a reduction in voltage as a result of loading, this reduction in voltage is coupled to the operational amplifier 36 thereby causing a commensurate reduction in voltage of the −15 volt regulated output on the line 44. However, if there is loading of the −15 volt regulated line 44, this is not normally reflected back into the +15 volt supply 10, such that the magnitudes of the two voltages now no longer track each other.

It should be obvious that the above description applies equally well to a minus supply driving a positive supply, and to supplies having diverse, though related voltages (such as +20 and −5, or such as −10 and +15).

According to the present invention, the magnitude of voltage on the −15 volt regulated line 44 is sensed by means of a threshold detecting amplifier 46 which includes a normally reverse-biased diode 48 connected to a point 49 of a voltage divider circuit consisting of three resistors 50-52 between the +15 volt regulated line 12 and a negative reference voltage at a point 54, which is provided by a resistor 56 and a Zener diode 58 connected between ground and the unregulated negative voltage line 31. The voltage at the point 54, in this example, may typically be about −13 volts. A more positive point 60 in the voltage divider is connected to the base of an NPN transistor 62, the collector of which is connected by a line 64 to a clamping input of the operational amplifier 22. In this instance, the operational amplifier 22 may be of any well known type, such as that sold under the trade designation LM101A by National Semiconductor. In that well known operational amplifier configuration, pin 8 is designated as a compensation input, and provides a clamping function which may be used to clamp the amplifier output to limit the voltage swings in either direction, to dampen any tendency towards oscillatory action, or to provide a unidirectional clamp, as in the present case. All of this is well known in the art and forms no part of the present invention.

In operation, when the two power supplies are properly loaded and each is providing an output having a magnitude of ±15 volts, the diode 48 is reserve biased since the point 49 has a potential of on the order of −12 volts. However, once the negative supply 32 is sufficiently heavily loaded so that its output voltage falls below −12 volts, the diode 48 becomes forward biased causing the point 49 to follow the voltage on the line 44, which causes the point 60 to become increasingly positive. In normal operation, the transistor 62 is cut off, thereby providing no input to the operational amplifier 22. As the point 60 becomes more positive, however, the transistor 62 conducts in a manner proportional to the voltage at the point 60, which in turn is proportional to the voltages of the lines 12 and 44. This causes an increasing current flow through the transistor 62 which in turn provides an increasing clamping action that lowers the magnitude of the output voltage of the operational amplifier 22, so that the voltage input to the buffer amplifier 14 on the line 20 is reduced, thereby causing a concomitant reduction in the +15 volt regulated line 12. In fact, by suitable choice of components, the relationship can be made substantially linear, as is illustrated in FIG. 3. The components in the threshold amplifier 46, in a ±15 volt supply as disclosed, may, for example, be as follows:

| Resistors | Ohms |
| --- | --- |
| 50 | 24.9K |
| 51 | 18.2K |
| 52 | 1.58K |
| 56 | 1.0K |
| Transistor 62 | 2N930 |
| Diodes | |
| 48 | 1N485B |
| 58 | 1N3029 |

Under these conditions, once the −15 volt line falls below −12 volts, the point 60 will initially be at about +0.6 volts, which is not enough to cause the transistor 60 to conduct. However, once the threshold is reached at approximately −9.7 volts (as seen in FIG. 3), the voltage at the point 60 has achieved approximately +0.7 volts, and the transistor 62 is conducting sufficiently to just begin the clamping action of the operational amplifier 22. When the voltage on the line 44 reaches −8 volts, the voltage on the line 12 is about +12.8 volts, and the voltage at the point 60 is about +0.8 volts, and so forth.

Figure 2:
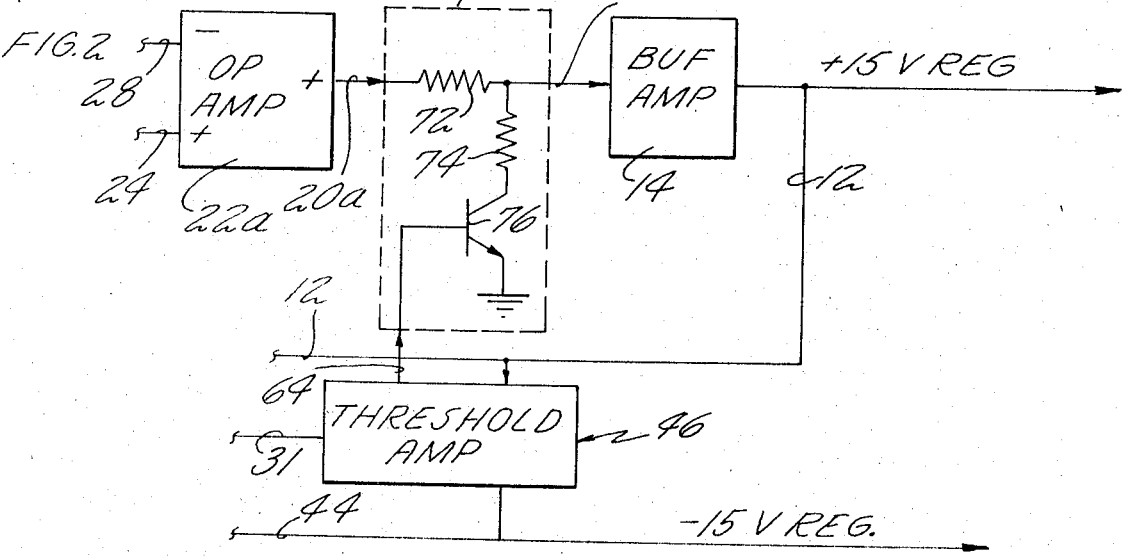
FIG. 2 is a partial schematic block diagram of an alternative embodiment of the present invention.

The clamping action of the +15 volt regulated supply 10 can be achieved, as illustrated in FIG. 2, by an external clamping circuit 70 of any well known configuration. In this case, the operational amplifier 22a need not necessarily have a clamp input. The clamp 70 typically comprises a pair of resistors 72, 74 and a transistor 76 having its emitter grounded and its collector connected to the resistor 74, its base being connected to the line 64 so as to cause it to be responsive to the control voltage thereon on the special amplifier 46. In the embodiment of FIG. 2, the clamping action is variable in dependence upon the voltage on the line 64, and the parameters of the clamp 70 may be so chosen as to provide the desired relationship between the tracking of the +15 volt regulated voltage on the line 12 with respect to the −15 volt regulated line 44.

It should be noted that the threshold is not necessarily the threshold at which the diode 48 becomes forward biased, but rather the point at which the clamping action begins, which is somewhat different; in the example hereinbefore, forward bias of the diode 48 occurs at approximately −12 volts, but the clamping effect of the control voltage on the line 64 is not felt until the line 44 is lowered to approximately −9.7 volts. This is the threshold point as is illustrated in FIG. 3. This threshold is utilized so as to prevent interference with the tracking of the −15 volt supply to the +15 volt supply, except when the loading of the −15 volt supply becomes sufficiently great as to warrant a change in the master slave relationship to provide a certain measure of protection to the circuitry being driven by the combined supplies.

It should further be noted that because of the fact that the voltage divider including the resistors 50-52 is connected to the +15 volt regulated supply line 12, rather than to some other positive source, there is a feedback effect on the threshold amplifier 46 which tends to cause the relationship between the +15 volt regulated line and the −15 volt regulated line to be substantially linear (this linearity is not necessarily the volts versus load characteristic shown in FIG. 3, but rather the fact that for any given voltage of the −15 volt supply (once tracking is instituted beyond the threshold), the +15 supply will linearly relate to it.

Although the invention has been shown and described with respect to preferred embodiments thereof, it should be understood by those skilled in the art that the foregoing and various other changes and omissions in the form and detail thereof may be made therein without departing from the spirit and the scope of the invention.

Having thus described typical embodiments of my invention, that which I claim as new and desire to secure by letters Patent of the United States is:

1. A short circuit protected master/slave power supply comprising:
a master power supply;
a slave power supply connected for response to said master power supply;
control means connected to the output of said slave power supply for detecting a reduction in its output voltage in excess of a given magnitude and for generating a control signal related to the output voltage of said slave supply, said control means including:

reference means providing a voltage reference having a magnitude lower than that of the nominal output of said power supply by an amount of voltage related to said given magnitude of voltage reduction;

a voltage divider connected between the output of said master power supply and said reference means;

a normally reverse-biased diode connected from a first point in said voltage divider to the output of said slave power supply; and a transistor having its base connected to a second point in said voltage divider, the current through said transistor providing said control signal; and means included within said master power supply and connected for response to said control means for clamping the output of said master power supply in a manner substantially proportional to said control signal.

2. A short circuit protected master/slave power supply according to claim 1 wherein said master power supply includes an operational amplifier having a reference input and said control signal is applied to said reference input for clamping the output voltage of said operational amplifier.

3. A short circuit protected master/slave power supply according to claim 1 wherein said master power supply includes an operational amplifier and a buffer amplifier and a variable clamp circuit connected from the output of said operational amplifier to the input of said buffer amplifier, the output of said buffer amplifier comprising the output of said power supply, said variable clamp circuit being connected for response to said control means and providing clamping of the output of said operational amplifier in proportion to said control signal.

* * * * *